Jan. 2, 1923.
F. D. WILSON.
CORN HARVESTER.
ORIGINAL FILED NOV. 6, 1916.
1,440,517.
2 SHEETS—SHEET 2.
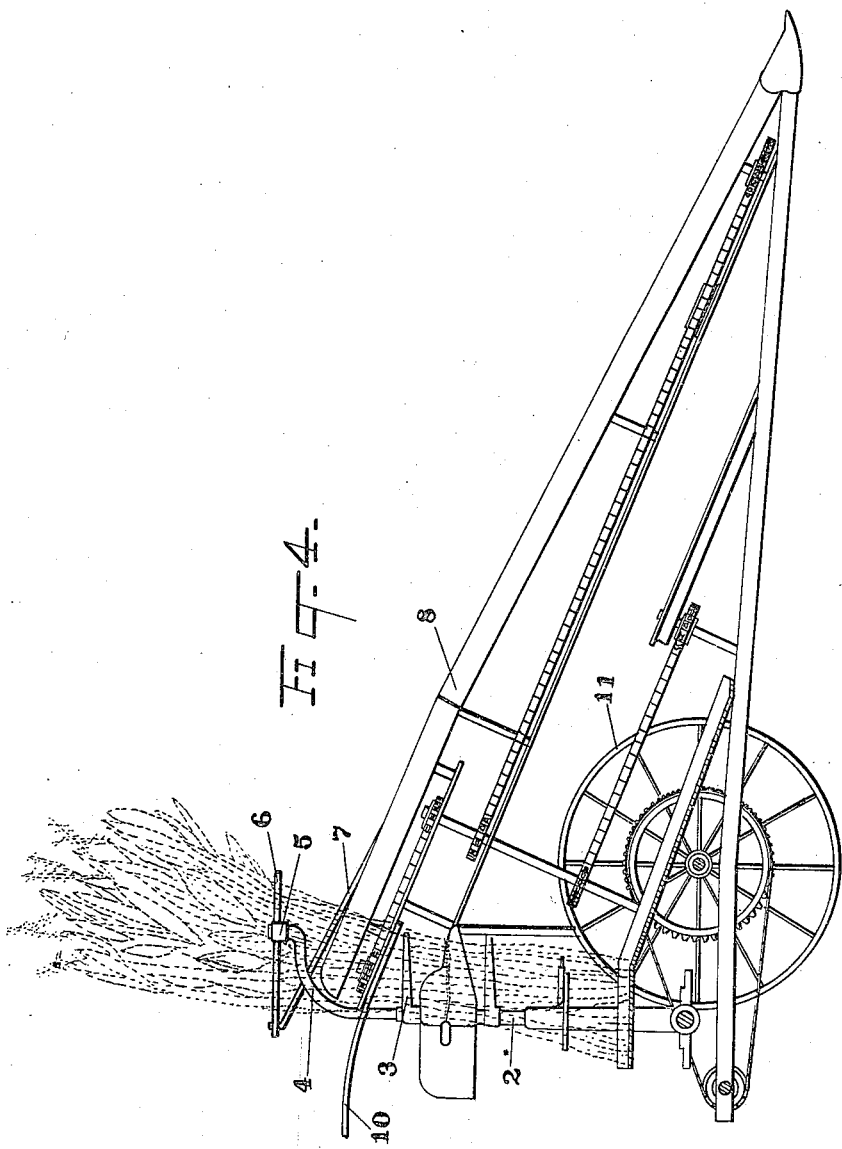

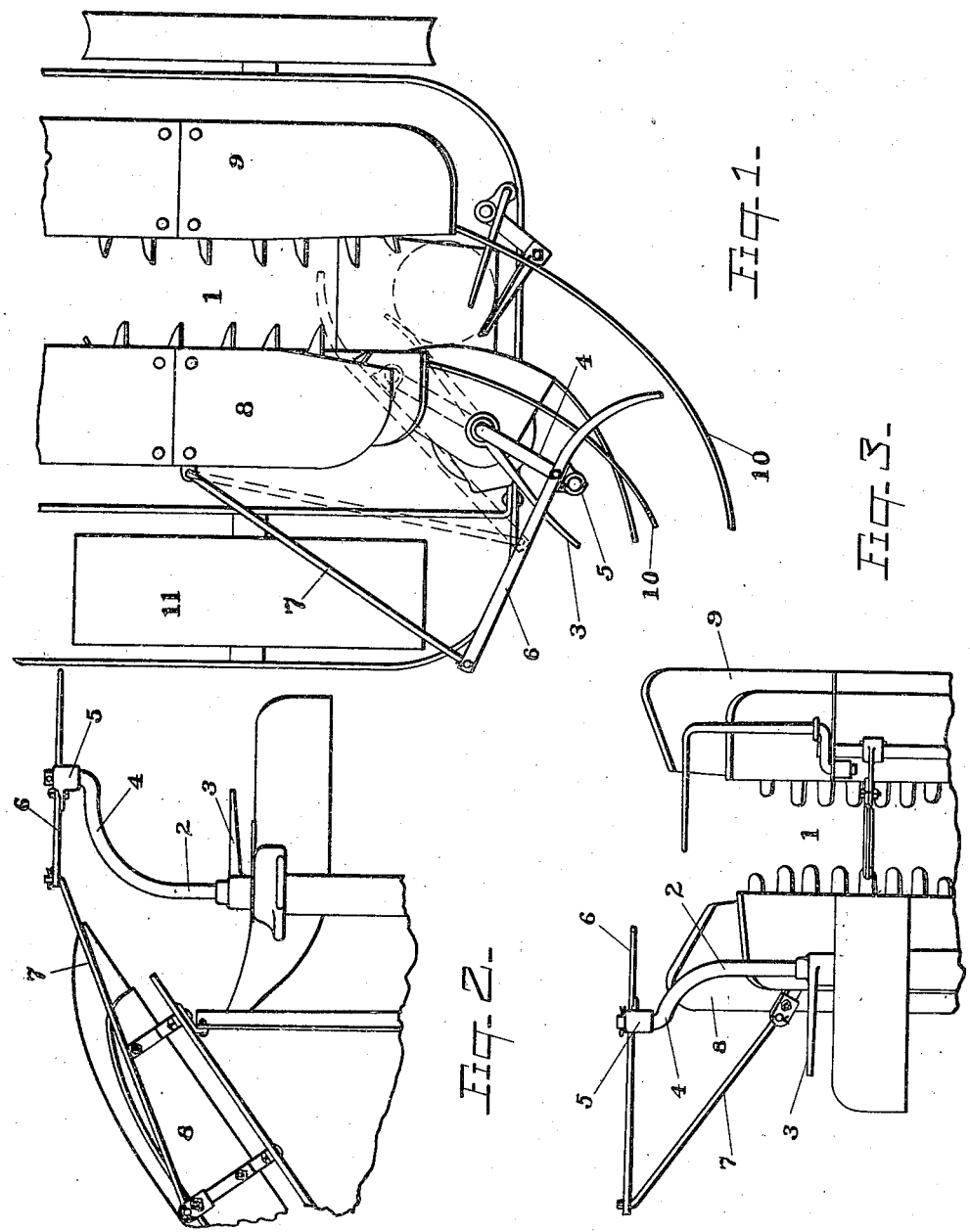

Patented Jan. 2, 1923.

1,440,517

UNITED STATES PATENT OFFICE.

FREDERICK D. WILSON, OF MOLINE, ILLINOIS, ASSIGNOR TO DEERE AND COMPANY, OF MOLINE, ILLINOIS, A CORPORATION OF ILLINOIS.

CORN HARVESTER.

Application filed November 6, 1916, Serial No. 129,735. Renewed August 12, 1921. Serial No. 491,872.

*To all whom it may concern:*

Be it known that I, FREDERICK D. WILSON, a citizen of the United States, residing at Moline, in the county of Rock Island and State of Illinois, have invented certain new and useful Improvements in Corn Harvesters, of which the following is a specification, reference being had therein to the accompanying drawing.

My invention relates to corn harvesters of the well known vertical type by which corn is cut and conveyed rearwardly to a binding mechanism where it is bound into bundles while in a vertical position, and my invention has for its object to add to the effectiveness of the ejecting mechanism so as to place the bound bundle properly upon a bundle carrier, or upon a conveyer forming part of a loader, or if a bundle carrier or loader is not used and the bundles are dropped to be later shocked by manual labor, my device gives a positive impetus to the bundles as they are discharged from the binder so that they fall stubbleward and far removed from the path of the team or the machine on the next round.

Figure 1 is a plan view of the rear end of a corn harvester with my device attached and showing as much of the harvester necessary to illustrate its application.

Figure 2 is a side elevation in part of Figure 1, and

Figure 3 is a rear view of Figure 2.

Figure 4 is a longitudinal vertical section of a corn harvester showing my device in position to discharge a bundle, and the bundle in dotted lines.

The corn harvester upon which my device is employed is well known in the art and I have shown as much of the machine as is necessary to illustrate the application of my improvement, it being well understood that the corn is cut and conveyed to the binding mechanism, made into a bundle and tied while in a vertical position, the operative power being produced by the traction of the bull wheel of the machine and transmitted to the cutting, conveying and binding mechanism in a well known manner.

It is presumed the corn has been cut and conveyed through the passage 1 to the binder mechanism where it is bound as shown in dotted lines in Figure 1. On the upper portion of the knotter shaft 2 is mounted the ordinary type of ejector arm 3 commonly employed in harvesters and binders adjacent the knotter; a crank arm 4 terminates the knotter shaft 2 and extends vertically above the height of the machine. Mounted pivotally on the end of the crank arm 4 is a member 5 to which is rigidly secured, intermediate its ends, an ejector 6 having its free end curved rearwardly to more effectively operate upon a bundle. A link 7 is pivotally connected to the opposite end of the ejector 6 and extends forwardly to pivotal connection with a part of the machine, preferably the stubbleward divider board 8 which, with a similar board 9, extends the length of the passage 1. The usual guide arms 10 project stubbleward from the rear of the machine to cause the bundle to travel stubbleward as it is ejected from the machine.

The binding mechanism of a type common in the art and not shown in the drawings, is actuated by power from the bull wheel 11, and when the mechanism is tripped to operate in tying a bundle, the initial movement of the knotter shaft 2 brings the ejector arm 3 and the ejector 6 into position forward of the bundle, as shown in dotted lines in Figure 1; the tying having been completed, the knotter shaft completes its revolution, the ejector arm 3 acting against the bundle, adjacent the tie, and forcing it rearward between the guide arms 10, at the same time the ejector 6 is also acting against the bundle with a longer period of contact, and as the ejector 6 is located above the extreme height of the machine, and a material distance above the ejector arm 3, its force is exerted near the top of the bundle giving the latter a movement beyond that imparted by the ejector arm 3, and consequently causing the bundle to fall practically at a right angle to the line of draft so as to be readily and effectively received by a bundle carrier or conveyer of a loader.

This ejector 6 is of great advantage when the corn stalks are long. They are frequently fed forward to the bundle-forming and tying-mechanism so rapidly that the upper ends of the stalks become more or less entangled. A device like that at 6 acts to separate the upper parts of the stalks of the bundle from the stalks which follow it.

The orbital movement of the point of the arm 6 is such as to bring the point of the arm into the passage 1 at the proper predetermined time, and as the bundle is moved backward it assists in separating stalks of the bundle from those behind it in the way described; and then, as the bundle is ejected from the machine by the ejector arm 3, the ejector 6 acts upon the top part of the bundle, which is found advantageous when the stalks are long, and the ejector, through its engagement with the bundle, causes the upper part of the latter to move backward or outward while the lower arm is moving the central or lower part of the bundle in a similar direction. It may be so related or timed as to continue its engagement after the lower arm is released, as this will insure that the upper part of the bundle will descend sufficiently rapidly, in relation to the lower end, to have it deposited properly. When the corn is tall, as aforesaid, such an ejector is necessary to effect a clean separation of the bundles and to deliver them stubbleward where they are deposited upon the ground in positions substantially at right-angles to the line of travel of the harvester.

What I claim is—

1. In a corn harvester adapted to cut and to bind corn in bundles in a vertical position, the combination of a passage through which corn is conveyed from the cutter to the binder, an ejector arm operative to project within said passage to discharge a bundle therefrom, and an ejector adapted to extend into said passage to engage with the top part of the bundle, and co-operating with the ejector arm to discharge the bundle, said ejector operating upon the bundle for a longer period than the ejector arm as the bundle is discharged.

2. In a corn harvester adapted to cut and bind corn in bundles in a vertical position, the combination of a passage through which corn is conveyed from the cutter to the binder, an ejector arm operative to enter said passage to discharge a bundle therefrom, an ejector operative to enter said passage forward of the ejector arm to engage with the top part of the bundle and assist in separating the stalks thereof from those which follow it and co-operating with the ejector arm to discharge the bundle, said ejector operating upon the bundle for a longer period than the ejector arm as the bundle is discharged.

3. In a corn harvester adapted to cut and bind corn in bundles in a vertical position, the combination of a passage through which corn is conveyed from the cutter to the binder, an ejector arm operative to enter said passage to discharge a bundle therefrom, an ejector supported on the upper end of the knotter shaft of the binder and operative to enter said passage forward of the ejector arm to engage with the top part of a bundle and separate its stalks from those which follow it, and co-operating with the ejector arm to discharge the bundle.

4. In a corn harvester adapted to cut and bind corn in bundles in a vertical position, the combination of a passage through which corn is conveyed from the cutter to the binder, an ejector arm operative to enter said passage to discharge a bundle therefrom, an ejector located above the knotter mechanism and operative simultaneously with said ejector arm and entering said passage therewith forward of the ejector arm to engage with the top part of the bundle to assist in separating its stalks from those which follow it, and co operating with the ejector arm to discharge the bundle, said ejector operating upon the bundle for a longer period than the ejector arm.

5. In a corn harvester adapted to cut and convey corn in a vertical position to a binding mechanism, the combination of a passageway, guide arms leading stubbleward from the binder, an ejector arm operative to enter said passageway to discharge a bundle therefrom rearward and stubbleward between said guide arms when the bundle is bound, and an ejector located above the knotter mechanism and operative to enter said passageway forward of the ejector arm to engage with the top part of the bundle and to discharge the bundle, said ejector operating upon the bundle for a longer period than the ejector arm and co-operating with said guide arms to discharge said bundle at an angle to the line of advance of the harvester.

6. In a corn harvester adapted to cut and convey corn in a vertical position to a binding mechanism, the combination of a passageway, guide arms leading stubbleward from the binder on each side of said passageway, an ejector arm operative to enter said passageway to discharge a bundle rearward and stubbleward between said guide arms when the bundle is bound, and an ejector located above the knotter mechanism and at the upper end of the knotter shaft and acting to engage with the top part of the bundle and co-operating with the ejector arm and the guide arms to discharge the bundle stubbleward.

7. In a corn harvester adapted to cut and bind corn in bundles in a vertical position, the combination of a passage through which corn is conveyed from the cutter to the binder, an ejector arm operative to enter said passage to discharge a bundle therefrom, a crank arm mounted on the upper end of the knotter shaft of the binder, an ejector pivotally supported on said crank arm and operating to enter said passage forward of the ejector arm and simultaneously therewith to support the top of a bundle as the latter is formed and bound and co-operating with the ejector arm to discharge the bundle.

In testimony whereof I affix my signature, in presence of two witnesses.

FREDERICK D. WILSON.

Witnesses:
 JESSIE SIMSER,
 W. G. DUFFIELD.